United States Patent
Choi

(10) Patent No.: US 10,063,790 B2
(45) Date of Patent: Aug. 28, 2018

(54) VIRTUAL FLYING CAMERA SYSTEM

(71) Applicant: Woncheol Choi, San Jose, CA (US)

(72) Inventor: Woncheol Choi, San Jose, CA (US)

( * ) Notice: Subject to any disclaimer, the term of this patent is extended or adjusted under 35 U.S.C. 154(b) by 162 days.

(21) Appl. No.: 14/875,330

(22) Filed: Oct. 5, 2015

(65) Prior Publication Data
US 2017/0099441 A1 Apr. 6, 2017

(51) Int. Cl.
| H04N 5/247 | (2006.01) |
| B64C 39/02 | (2006.01) |
| B64D 47/08 | (2006.01) |
| G06T 7/20 | (2017.01) |
| G06K 9/00 | (2006.01) |
| G06T 15/20 | (2011.01) |
| H04N 5/262 | (2006.01) |
| H04N 5/77 | (2006.01) |
| H04N 9/804 | (2006.01) |

(52) U.S. Cl.
CPC ........... H04N 5/247 (2013.01); G06T 15/205 (2013.01); H04N 5/2627 (2013.01); H04N 5/77 (2013.01); H04N 9/8042 (2013.01)

(58) Field of Classification Search
None
See application file for complete search history.

(56) References Cited

U.S. PATENT DOCUMENTS

| 7,577,199 B1* | 8/2009 | Herz ................... G06T 7/248 348/143 |
| 2004/0246336 A1* | 12/2004 | Kelly, III ........... G06K 9/00771 348/143 |
| 2004/0257444 A1* | 12/2004 | Maruya ............ G08B 13/19645 348/169 |
| 2004/0258152 A1* | 12/2004 | Herz ..................... G06T 7/246 375/240.16 |
| 2007/0052858 A1* | 3/2007 | Zhou .................. G06K 9/00771 348/584 |
| 2008/0129825 A1* | 6/2008 | DeAngelis ......... A63B 24/0021 348/169 |
| 2008/0192116 A1* | 8/2008 | Tamir ..................... G06T 7/292 348/157 |
| 2011/0128387 A1* | 6/2011 | Gans ....................... H04N 7/181 348/169 |
| 2012/0243730 A1* | 9/2012 | Outtagarts ............... G06T 7/292 382/103 |
| 2012/0328153 A1* | 12/2012 | Yu ....................... G06K 9/00771 382/103 |
| 2013/0148861 A1* | 6/2013 | Ferlatte .............. G06K 9/00724 382/107 |
| 2014/0037213 A1* | 2/2014 | Niederberger .......... G06T 11/00 382/195 |
| 2014/0050455 A1* | 2/2014 | Ni ......................... H04N 9/8227 386/224 |

* cited by examiner

Primary Examiner — Kate Luo

(57) ABSTRACT

A virtual flying camera system is disclosed. According to one embodiment, the virtual flying camera system includes a plurality of cameras disposed along a track and spaced apart from each other, a recording system configured to receive input video streams from the plurality of cameras, and a control system configured to generate an output video stream from the input video streams. The output video stream includes a view of a virtually flying camera following a target at a user-adjustable speed. The control system generates the output video stream by merging a plurality of portions of the input video streams from adjacent cameras of the plurality of cameras.

20 Claims, 5 Drawing Sheets

VIRTUAL FLYING CAMERA SYSTEM

FIELD

The field of this disclosure relates generally to camera systems, particularly to camera systems including multiple cameras.

BACKGROUND

Sports videography requires sophisticated camera operations. Since showing a right target subject in a desired angle is a key to successful sports videography, a typical sports videography system requires multiple cameras, and an individual camera operator for each camera shoots scenes of a sports game following a target subject. Typical multiple cameras used in a multi-camera system aim at and follow a moving target from their fixed locations. Some camera systems provide a sweeping view of a target at a moment of interest using the inputs from multiple cameras as if a single camera is rotating around the target and display a still image of the target in time.

Due to the physical constraints of a camera that is mounted on a static base, various limitations exist. For example, a single camera provides only a single viewpoint that has a specific field of view. Even multiple cameras may still miss an event or moment that may occur during a game play.

For fast track sports games such as auto racing, speed ice skating, field track, a stationary mounted camera poses challenges to follow a target subject in real-time during a live game. A flying camera mounted on a wire or a drone equipped with a camera can provide more interesting camera views and angles. For example, the flying camera can follow a fast-moving subject and show the subject in a consistent angle and distance highlighting exciting elements of the sports game such as an expression, motion, and action of a player, or a scene when the player passes another player during a game. A capability of following a target subject and providing scenes of interesting moments significantly increases a commercial value of a sports videography system, particularly in a sports game.

A flying camera has its own limitations. First, the flying camera poses a potential hazard and danger to players and spectators. Second, a shooting duration and a range of the flying camera are limited. For example, a wire for a flying camera cannot go beyond a straight section of a track and can cover only a portion of the entire track. Third and the most importantly, a flying camera provides a single viewpoint at a given camera speed and angle. The flying camera has to fly to a precisely right location at a right speed in order to capture a desired scene or action of a target subject. In addition, there is only one chance to fly the flying camera and shoot a scene. If the camera operator misses the chance, the obtained video stream may not include a desired scene or action of a target subject. The camera speed and angle of the flying camera is difficult to control, and is impossible to change after the camera shooting is completed. Furthermore, scenes that are more interesting may happen at an unintended location where the flying camera may not aim and cannot reach. For example, in an auto racing, cameras may be chasing the front lead and famous cars, but an accident can happen in an unexpected location of the racing track at an unexpected time. If there is no camera shooting at the unexpected location at the particular time during the auto racing, the scenes of the accident may not be properly obtained. Even scenes of the accident may be captured by some of the cameras, the camera angle of those cameras may not be ideal to capture the detailed actions of the accident.

SUMMARY

A virtual flying camera system is disclosed. According to one embodiment, the virtual flying camera system includes a plurality of cameras disposed along a track and spaced apart from each other, a recording system configured to receive input video streams from the plurality of cameras, and a control system configured to generate an output video stream from the input video streams. The output video stream includes a view of a virtually flying camera following a target at a user-adjustable speed. The control system generates the output video stream by merging a plurality of portions of the input video streams from adjacent cameras of the plurality of cameras.

The above and other preferred features described herein, including various novel details of implementation and combination of elements, will now be more particularly described with reference to the accompanying drawings and pointed out in the claims. It will be understood that the particular methods and circuits are shown by way of illustration only and not as limitations of the claims. As will be understood by those skilled in the art, the principles and features of the teachings herein may be employed in various and numerous embodiments without departing from the scope of the claims.

BRIEF DESCRIPTION OF THE DRAWINGS

The accompanying drawings, which are included as part of the present specification, illustrate presently preferred embodiment and together with the general description given above and the detailed description of the preferred embodiment given below serve to explain and teach the principles described herein.

Figure 1:
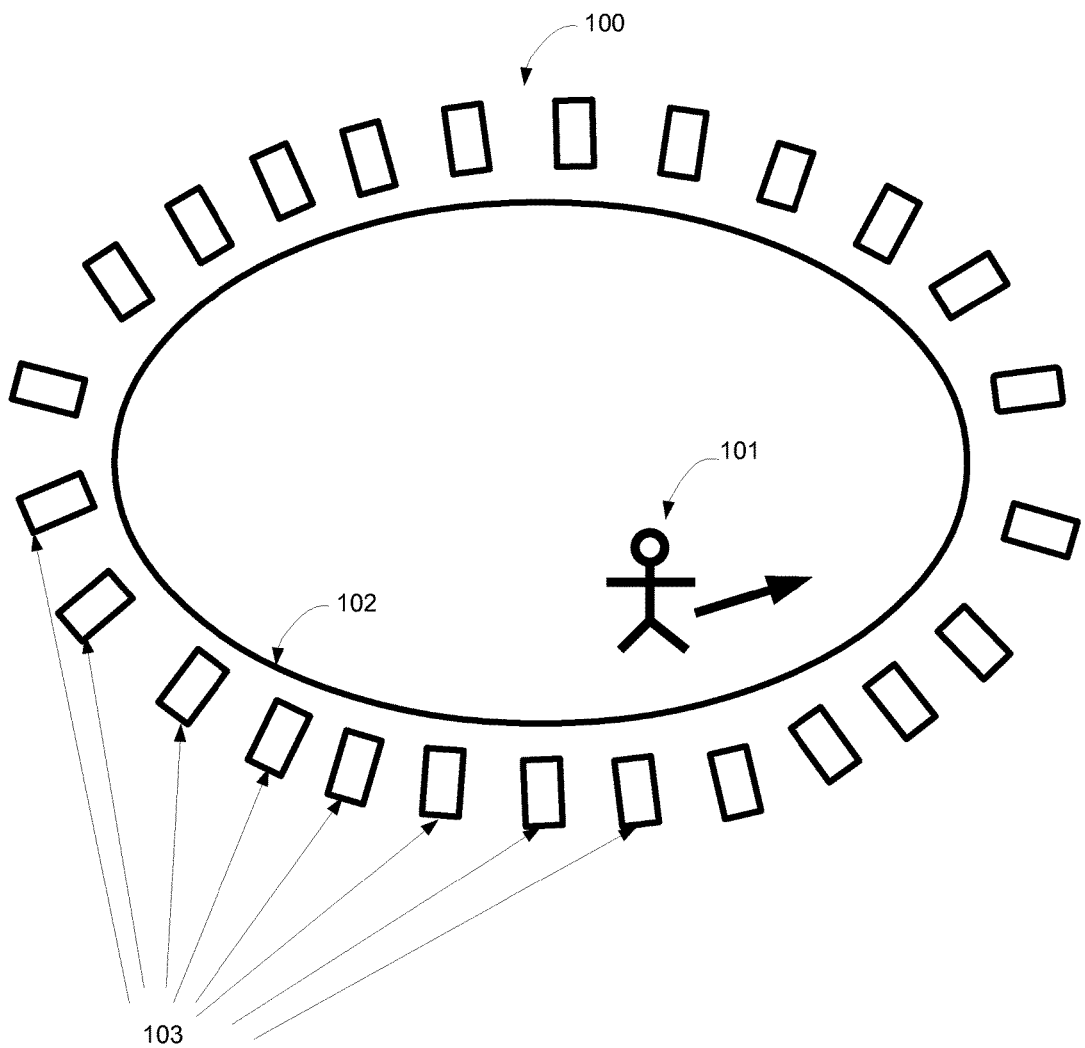
FIG. 1 illustrates an exemplary virtual flying camera system, according to one embodiment.

It should be noted that the figures are not necessarily drawn to scale and that elements of similar structures or functions are generally represented by like reference numerals for illustrative purposes throughout the figures. It also should be noted that the figures are only intended to facilitate the description of the various embodiments described herein. The figures do not describe every aspect of the teachings disclosed herein and do not limit the scope of the claims.

DETAILED DESCRIPTION

A virtual flying camera system is disclosed. According to one embodiment, the virtual flying camera system includes a plurality of cameras disposed along a track and spaced apart from each other, a recording system configured to receive input video streams from the plurality of cameras, and a control system configured to generate an output video stream from the input video streams. The output video stream includes a view of a virtually flying camera following a target at a user-adjustable speed. The control system generates the output video stream by merging a plurality of portions of the input video streams from adjacent cameras of the plurality of cameras.

In the following description, for purposes of explanation only, specific nomenclature is set forth to provide a thorough understanding. However, it will be apparent to one skilled in the art that these specific details are not required to practice the concepts described herein.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

The above and other preferred features described herein, including various novel details of implementation and combination of elements, will now be more particularly described with reference to the accompanying drawings and pointed out in the claims. It will be understood that the particular methods and circuits are shown by way of illustration only and not as limitations of the claims. As will be understood by those skilled in the art, the principles and features of the teachings herein may be employed in various and numerous embodiments without departing from the scope of the claims.

The present disclosure provides a way to significantly improves the video shooting dynamic scenes in various environments, particularly a fast track sports such as auto racing, speed ice skating, and short track ice skating. The present camera system uses multiple stationary cameras and does not have to have moving parts or a track to physically move the cameras to follow a moving target object. The cameras having a low profile can be stationarily installed at a sports venue along a track without any moving parts.

The present camera system can generate a video stream following a moving target subject although none of the cameras physically may follow the moving target subject. The video stream is reconstructed or reproduced from the video streams taken with the plurality of cameras. The video stream includes a view of a virtually flying camera that appears to be moving or flying along with the moving target object. The position, angle, direction, and/or speed of the virtual flying camera are user-adjustable such that video streams having different position, angle, direction, and/or speed can be reconstructed or reproduced. The present camera system can also record all parts of a track during a game or an event. Thus, when an unexpected event of interest occurs, the present camera system can fully reconstruct the event and create a flying observation of the scene.

According to one embodiment, the present camera system receives video frames from multiple stationarily installed cameras and creates an output video stream displaying a moving target object within an output video frame, for example, at the center of the output video frame. The present camera system may not have any moving parts to follow the moving target object but is capable of creating a visual illusion to a viewer as if a camera is actually flying along with the moving target object. Herein, such a virtually flying camera is also referred to as a virtual flying camera.

According to one embodiment, a flying of the virtual flying camera is accomplished by two components including simulation of the flying in each camera video stream and merging of the video frames received from multiple adjacent cameras. The simulation and merging may occur concurrently or separately in any sequence. The simulation of the flying is mimicked by placing a target object at a desired portion (e.g., a center) of an output frame. Therefore, the simulation may require shifting, cutting, zooming, and/or stitching input frames that are taken concurrently or at different times (e.g., stitching a background image). In one embodiment, the simulation of the flying is accomplished by shifting the input video frames to the opposite direction of the target object's motion and placing the target object at the center (or anywhere at a desired location within the video frames) of the output video frame. In some embodiments, the simulation of the flying is accomplished by selecting a portion of the input video frames without shifting the input video frames. For example, the input video frames are obtained in a high resolution with a large field of view, and a desired portion of the input video frames are cut and zoomed in to obtain a portion of video frames for merging. When using-high resolution cameras, the field of views of the adjacent cameras may overlap. The use of high-resolution cameras may reduce or eliminate a need for input video frame shifting to generate the output video frame. The merging of the frames from multiple adjacent cameras provides a seamless blending and interpolation of the video frames.

According to one embodiment, the present camera system provides a fully controllable camera speed. The camera speed of the virtual flying camera can be predetermined to be the same or different from the speed of the target object. In addition, the camera speed of the virtual flying camera can be adjusted to a desired speed by the simulation and merging processes. Since the present camera, system captures all the scenes of a venue during an event, therefore many different output video streams having different camera speeds. The amount of image shifting within a received video frame may vary depending on the speed of the target object and/or the speed of the virtual flying camera. In some embodiments, the speed of the virtual flying camera may be automatically determined based on the speed of the target object. For example, the present camera system determines the speed of the target object by the time stamps of each video frame of the cameras based on the known distance between the cameras. Once a target is identified, the present camera system can generate an output video frame placing the target at the center (or anywhere at a desired location within the video frames) as if the virtual flying camera flies along with the target object.

Based on the speed of the virtual flying, multiple video frames received by multiple cameras may be merged. The number of multiple video frames being merged and used to create an output video frame may vary depending on the user-defined speed of the virtual flying as well.

According to one embodiment, the present camera system provides multi-target tracking. Multiple targets can be processed at the same time using the multiple cameras without a need for multiple camera systems or multiple flying cameras flying on a wire.

According to one embodiment, the present camera system can provide both live and recorded virtual flying on live video stream as well as on the recorded material. The smoothness of the final output video stream may depend on the number of cameras in the field. As the video frames of adjacent cameras are merged, a small difference in the video frames may cause a discontinuing effect. If a sufficiently large number of the cameras is used, the discounting effect may be reduced or minimized. For example, in a 30 frame per second (fps) video, all 30 frames may be created from the video frames of different cameras.

For a fast moving object, a faster camera shutter speed minimizes a motion blur in the output video stream. According to one embodiment, an artificial motion blur may be added to create more natural visual effects. The artificial motion blur is easy to obtain from the virtual flying speed.

For a nonlinear motion such as a circular motion, the present camera system performs a different simulation of the virtual flying that follows a moving target. In this case, the present camera system may perform an additional image processing for simulation of an angle change besides the linear shifting of the video frames. For example, a resizing or an additional zooming in and out may be performed on the received video frames to place the target at a desired portion of the output video stream at a desired scale (i.e., zooming in or out) and a desired direction and angle.

According to one embodiment, the present camera system may perform the capturing of the video frames in a higher resolution than the final output video resolution. In this case, the merging of the video frames could be more effective by utilizing out-of-frame video sections.

According to one embodiment, the present camera system performs an image processing to separate the moving target and a static background image from the received video frames. The final video output may include the background image that is taken at a different time. The background image may be merged with the target object with an independent image processing.

FIG. 1 illustrates an exemplary virtual flying camera system, according to one embodiment. The virtual flying camera system can be set up at various venues such as an auto racing track, a field track, speed ice skating track, and a short track ice skating track. However, it is understood that the present camera system can be used for other applications including, but not limited to, movie and video game production.

The virtual flying camera system 100 includes a plurality of cameras 103 that are placed along a track 102 of a sports venue. Each of the cameras 103 can take shots of a designated area of the track to cover the entire area of the track 102 at any given time.

The track 102 could be a sports stadium, an ice link, an auto-racing track, a horseracing track, a dog racing track, or any location that a videography shooting occurs. Other examples of the track 102 include, but are not limited to, a football, soccer, baseball, hockey, or ice hockey stadium, and a basketball and volleyball court.

It is noted that any number of cameras 103 may be placed at designated locations such as inside the track 102, on ceiling of the track 102, or on a moving platform that may move before, after or during a game. The cameras 103 are spaced apart by a predetermined distance or a varying distance depending on the location of the camera 103. For example, more cameras 103 are placed near or at a finish line of the track, thus the spatial gap between the cameras 103 near the finish line is narrower than that of the cameras 130 that are disposed away from the finish line. The narrower spatial gap between the cameras 103 can produce videos of a higher spatial resolution and smooth motion.

At any given point in time during a game, a subset of the cameras 103 follow a moving target 101 while other cameras 103 take shots of their own designated areas of the track. For example, the target 101 is a runner, a skater, a racing car, a horse, an airplane, a drone or any other moving person or object. In some embodiments, the target 101 may be a moving reference that may not be associated with a physical object or person. For the purpose of illustration, the target 101 is shown to be moving in the counter clockwise direction as shown in FIG. 1. In other non-track sports games such as football, soccer, baseball, hockey, and basketball, the moving target 101 may be moving randomly inside the track 102. Even in a non-track sports game, multiple cameras 103 capture videos of a moving target 101 because the cameras 103 cover the entire playing field or court of a sports game. The target 101 could be a single subject or any number or group of subjects that may be moving at various different speeds along the track 102.

There is no limit for the number of the cameras 103. For example, several hundred to several thousand of the cameras 103 may be used to cover the entire track 102 and provide a smooth, clear, and stable video images of a game at a desired camera angle and speed. In one embodiment, the cameras 103 face perpendicular to the track so that the camera angle is perpendicular to a direction of motion of the players of a game including the target 101. In this arrangement, the cameras 103 have a constant distance from the perimeter of the track 102, thus providing a constant field of view.

Each of the cameras 103 may have a zoom lens so that the captured scene has a right amount of field of view regardless of the physical location of the camera 103. The distance between the cameras 103 may be determined based the zoom lens and the field of view of each of the cameras. The adjacent cameras 103 must have an overlapping portion of the track such that a moving target 101 can be captured by multiple cameras 103 at any given time. The cameras 103 may have a faster shutter speed to minimize a motion blur effect and provide a smooth and seamless playback video. The camera 103 could be mounted along a track or along the seating areas for the spectators. Depending on the distance from the track, the camera 103 may be equipped with a proper optical lens.

Figure 2:
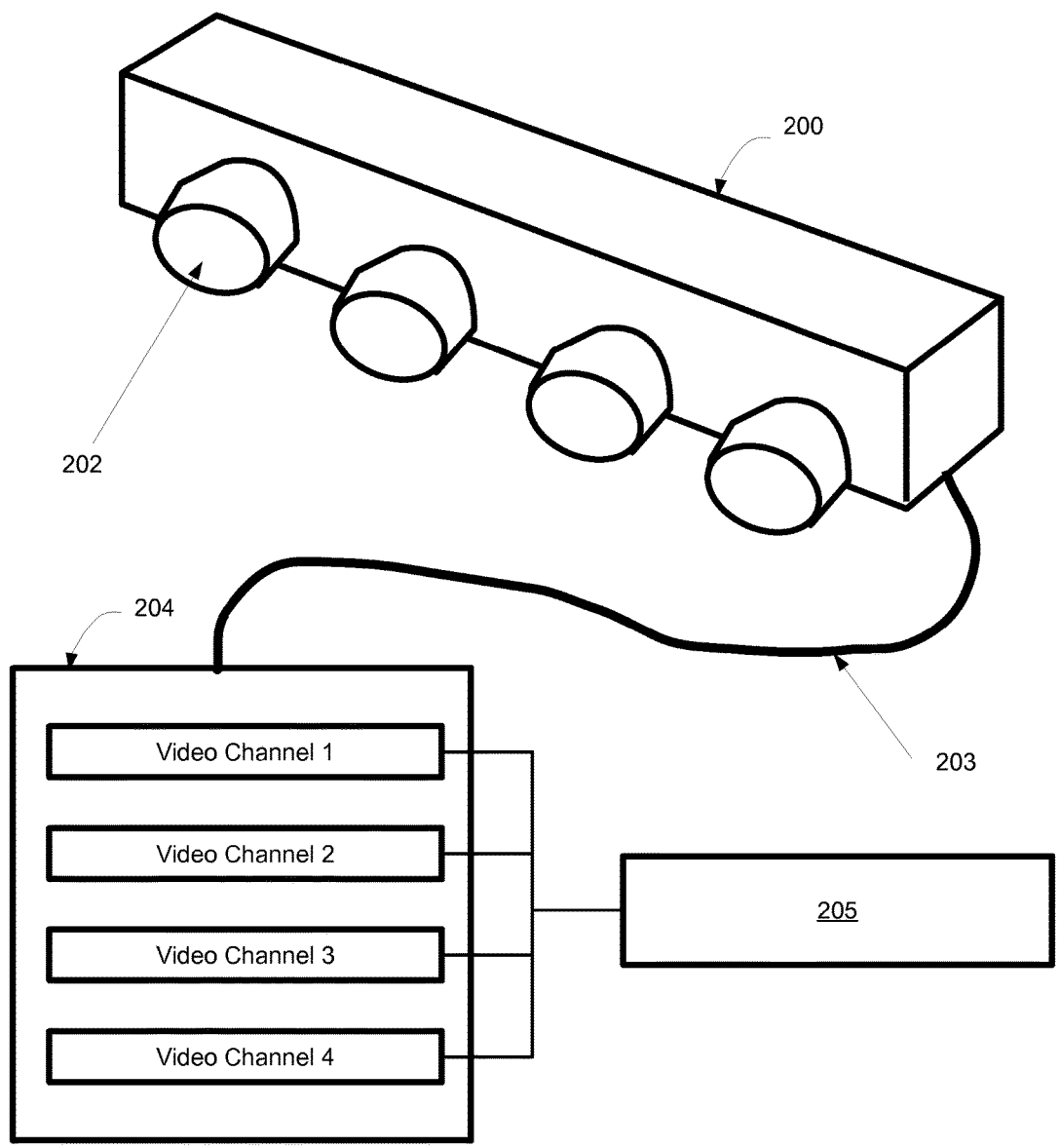
FIG. 2 shows a schematic diagram of an exemplary camera system, according to one embodiment.

FIG. 2 shows a schematic diagram of an exemplary camera system, according to one embodiment. A camera system includes at least one camera module 200. The camera module 200 includes one or more cameras 202 encased in a housing 201. Although four cameras 202 are shown in FIG. 2, it is understood that any number of cameras 202 may be incorporated in the camera module 200. Based on the total number of cameras 202 to be deployed, the camera system may include a plurality of camera modules 200. The camera modules 200 may be fixedly connected to each other or spaced apart from each other. The gap between the adjacent camera modules 200 may be set in such a way that the all cameras 202 of the camera system are spaced apart with a predetermined constant gap. According to one embodiment, the gap between the cameras 202 in the camera module 200 may be changed on the fly by various mechanisms that removably fix the cameras 202 to the camera module 200. The camera module 200 including multiple cameras 202 is a unit of a building block to build a camera system, for example, the virtual flying camera system 100 shown in FIG. 1.

Each camera 202 is mounted at a known position and angle with respect to the housing 201 of the camera module 200. The gap between the cameras 202 may be set to be uniform across the camera module 200, but it is understood that the gap can vary, for example, using a sliding mechanism, within the camera module 200. The camera module 200 outputs data in various formats including, but not limited to, a standard digital video format such as high-definition multimedia interface (HDMI) and serial data interface (SDI), and a video encoding format such as H.264 or H.265.

The camera module 200 is connected to a recording system 204 via a cable 203. The cable 203 may be a network cable (e.g., Ethernet cable) or a video/audio signal cable (e.g., RCA, composite, HDMI). In one embodiment, the recording system 204 is a video recording system such as a digital video recorder (DVR). The recording system 204 includes a data interface (not shown) to receive video data signals from the camera module 200 and a storage (not shown) for storing the raw and/or compressed video data received from the camera module 200. The recording system 204 may further store a video data that is processed from the received raw or compressed video data. The uncompressed video data over the HDMI or SDI interface may be stored as compressed in the recording system 204 to reduce the data size. The video data of multiple channels may be transferred from the camera module 200 to the recording system 204 over the cable 203 as encoded and/or compressed. If the video data that is already encoded and compressed is received, a standard data network interface such as gigabit network interface may be used as the data interface of the recording system 204.

The storage of the recording system 204 is used to save video streams from one or more camera modules. For example, input video streams from the camera module 200 include 16 channels or 32 channels of high-definition (HD) video data. As the data processing speed and performance, the network speed, and/or the storage size increase, more video channels may be saved in the storage of the recording system 204 at the same time. The size and speed of the storage may determine the number of video channels that can be concurrently received by the recording system 204 as well as the number of cameras 202 incorporated in a single camera module 200.

A control system 205 is connected to the recording system 204. The control system 205 receives a video stream from the recording system 204 and provides an interaction to the user. The video stream might be a recorded video stream from the recording system 204 or a live feed from the cameras 202. The live feed from the cameras 202 might be encoded and/or compressed in the storage of the recording system 204. The storage of the recording system 204 may have a memory buffer that can write and transfer data faster between the recording system 204 and the control system 205. The control system 205 processes the input video stream from the recording system 204 and generates a video output that will be delivered to a producer or directly to a viewer. The video output may be generated based on various control inputs from a user such as the target location, the start time, the end time, and the speed, and the angle, or the like. The video output is obtained in a mix-down process that will be explained in further detail below. The mix downstream allows a user to view any part of the track as if a single camera is flying through the track. The speed and angle of the virtually flying camera may be changed base on the control inputs. In some embodiments, the video output may be automatically generated with a minimal or no control input from the user.

According to one embodiment, multiple recording systems 204 may be connected to the control system 205. Each recording system 204 is connected to a corresponding number of camera modules 200. The camera system covers the entire venue and the control system simultaneously records the video streams from the cameras of one or more camera modules 200. If each video recording system can concurrently handle 32 channels, and 320 cameras are installed at the venue, 10 video recording systems are necessary for the camera system.

Figure 3:
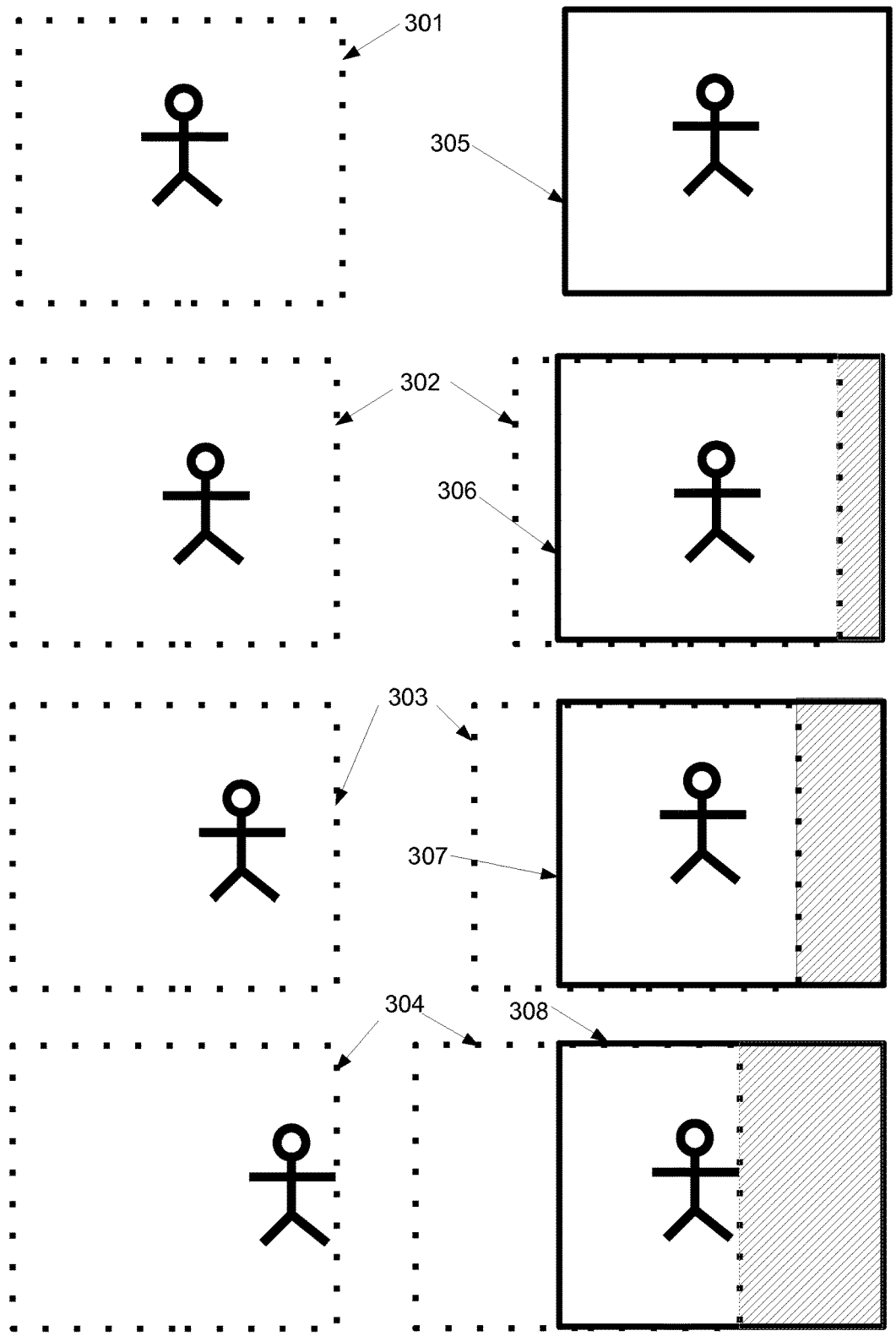
FIG. 3 explains an exemplary camera processing in a single stream, according to one embodiment.

FIG. 3 explains an exemplary camera processing in a single stream, according to one embodiment. An input video stream received from a camera includes video frames 301, 302, 303, and 304. Thus, each frame represents a time progress on the particular camera. As the target 300 moves to the right in the video stream, the image of the target 300 appears more toward the right side of the frame. The control system receives this video stream and generates an output video stream including the video frames 305, 306, 307, and 308. The output video stream is herein also referred to as a virtual flying camera shot because the output video stream appears to be a camera shot taken from a flying camera although no flying camera is used. Although four video frames are used in this example, it is understood that any number of video streams may be used to generate an output video stream from multiple cameras.

As a user defines the speed and angle of the virtual flying camera, the output video frame is shifted from the input stream to show the target 300 at a fixed location, in this case, at the center, within the output video stream. As shown in FIG. 3, the dotted line in the video frames 306, 307, and 308 represents the input video stream, and the solid line represents the output video stream.

If the speed of the virtual flying camera is identical to the target speed, the target 300 appears at the center of the output video stream. The shaded area for the video frames 306, 307, and 308 of the output video stream that is not shown in the input video stream is filled by an image from a next camera stream or a pre-recorded background video stream. For example, the background image of a track is pre-recorded and processed to associate with a particular camera. Each camera is associated with a portion of the background image of the track with a known field of view. The input video stream may overlap with the pre-recorded background image of the track to fill the shaded area that is missing from the input video stream at a particular video frame from a particular camera.

If the speed of the virtual flying camera is different from the target speed, an output video stream is generated to reflect the difference in the speeds. In one embodiment, the speed of the virtual flying camera may be doubled by shrinking the time scale in half using the same video frames 305-308. In another embodiment, the video frames may be skipped to speed up the virtual flying camera without changing the time scale of the output video stream. In one example, every other video frames (e.g., 305, 307 and so) may be used while keeping the same time scale of the input video stream. Conversely, the speed of the virtual flying camera can be slowed down by interpolating input video streams from multiple channels and generating more video frames than the input video streams or slowing down the time scale of the output video stream.

Figure 4:
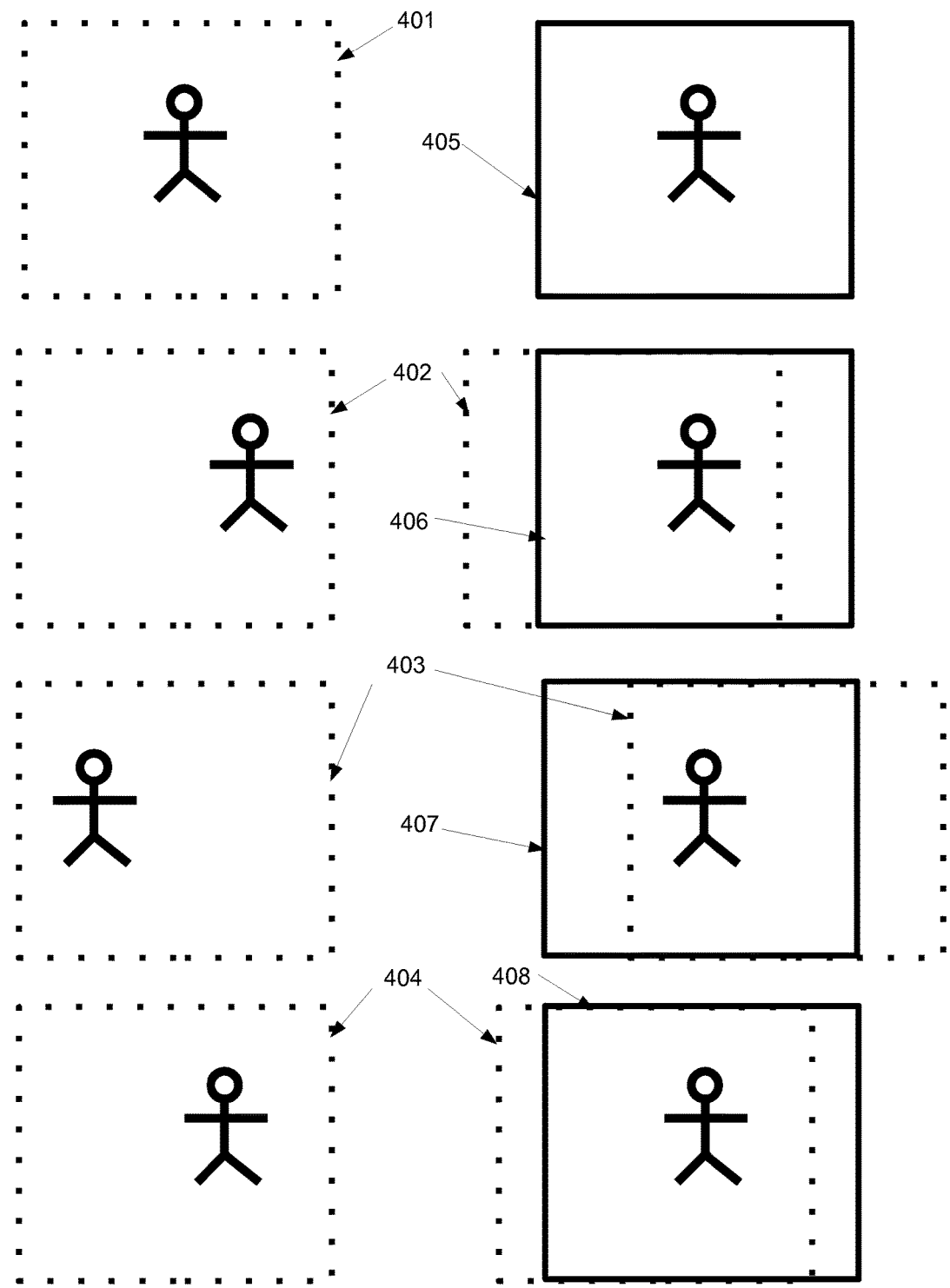
FIG. 4 shows an exemplary process for switching a video channel in an output video stream, according to one embodiment.

FIG. 4 shows an exemplary process for switching a video channel in an output video stream, according to one embodiment. Consecutive video frames 401 and 402 are received from of the camera 1. As the target 400 moves, the target 400 appears toward the right side in video frame 402. The video frame 403 is the next video frame on the camera 2 that is installed next to the camera 1. Since the camera 2 is installed on the right side of the camera 1, the target 400 may still appear at the left side of the video frame 403. The video frames 405, 406, 407, and 408 represent an output stream generated from the input video frames 401, 402, 403, and 404. The video frame 406 shows a shifting from the input stream 402 based on the virtual flying speed. The video frame 407 is the next frame that follows the video frame 406, but the input video stream for generating the video frame 308 is switched from the camera 1 to the camera 2. Therefore, the input video frame 403 is shifted to the right side to compensate the difference of the camera position. The video frame 408 is generated from the input video frame 404 of the camera 2 and shows a continuous motion of the target 400. The same process may repeat to follow the target from multiple cameras. The virtually flying camera, therefore, can follow a certain target as if a flying camera follows the target.

As the target makes a continuous move, either the camera system shifts the input video streams and switches to the next stream continuously. This camera shifting process makes it possible to place the target at the center of the output video stream. The camera system provides views an action of the target at a consistent angle, and the viewers perceive that the camera is flying along with the target.

Since all the cameras are continuously streaming, the viewpoint could be changed instantly to any part of the track. The flying speed can change to any speed by adjusting the time scale of the output video stream or skipping or interpolating multiple input video streams as explained above. Therefore, the virtually flying camera can track any target and multiple targets any time during a game play with an angle and speed that is controllable by a user or the camera system. The present camera system allows a broadcaster to select the right target as the sports game is progressing. Furthermore, the present camera system can simultaneously track multiple targets without deploying multiple flying cameras. The targets may be selected during the processing to reconstruct any target or even any part of the track without being limited to physically moving cameras that may not be able to cover the entire track. Since all the streams are concurrently recorded to the recording system, the present camera system can reconstruct any missing event or moment from the recorded data.

The present camera system includes multiple camera modules and multiple cameras stationarily mounted on, along, or around a venue. The present camera system does not require any moving part. The video recording system that captures the video stream from the multiple cameras. The control system that connects to the digital video recording system. A mix-down of the input video frames may occur to shift the input streams and provide smooth and seamless output video stream based on the virtual flying speed.

According to one embodiment, the present camera system runs a calibration procedure to calibrate the multiple cameras before (or after) a camera shooting. The calibration procedure provides a fine adjustment of the camera angles, brightness, colors, contrasts, field of views, etc. of input video frames to be obtained by the multiple cameras. The calibration is particularly useful for predetermining an amount of video frame shifting when merging two or more input video frames that are obtained from adjacent cameras. After the calibration procedure, the control system stores the calibration data and uses the calibration data to reconstruct a virtual flying using input video frames that are fed in real time or pseudo real time during an event or a game.

The calibration of the present camera system may be performed when a track is empty, and there are no moving target. In some embodiments, the calibration is performed by shooting a moving calibration object (e.g., a player in a practice run, a dummy cart, a lure on a track) along the track so that each of the cameras takes a shot of the calibration object at least once. In one embodiment, the moving calibration object has geometric and color patterns that are clearly visible and discernable to the cameras. Comparing the location of geometric pattern of the moving calibration object, the control system makes fine adjustment of the frame position of each channel. Comparing the colors of the moving calibration object, the control system makes the fine color and lighting adjustment of each channel. The calibration process ensures the seamless transition between channels so that a viewer can experience smooth and continuous camera motion.

The control system analyzes the video frames taken by each camera and samples portions of the video frames including the moving calibration object. The sampled video frames including the moving calibration object are used to reconstruct an output video frame that is virtually flying with the moving calibration object. The variations in color, light condition, camera angle, field of views, etc. among adjacent camera frames are adjusted to provide a smooth and stable output video frame. The fine adjustment of the color, light condition, camera angle, field of views, etc. may be performed manually and/or automatically.

During the calibration procedure of the present camera system, the multiple cameras generate video frames and send them to the control system. The background image of the track may be obtained during the calibration procedure, which is used for filling in shifted or partially cut input video frames when merging input video frames from adjacent cameras.

For an outdoor track, the calibration may be performed several times at different times of a day or different weather conditions so that the background image of the track that is obtained during the calibration can represent the best-fitted background image of a game depending on the time and weather condition.

The cameras have a high shutter speed to capture a fast moving object. The distance from the camera to a target may be pre-defined. The camera module has a mounting mechanism for multiple cameras to allow a fine adjustment of the position and angle. The camera module is connected to the recording system via a network cable or a multimedia cable. Although the present camera system may include stationarily mounted cameras, the cameras or the camera modules including one or more cameras of the present camera system may include a moving part to better track a dynamically moving target. The cameras of such a tracking camera system identify a movement of a target and follow the target as the target moves. The cameras of the present camera system may follow a particular target using a rotational and/or translational motor attached to the camera module 200 shown in FIG. 2. The target may be identified by an ID or an identifier attached to the target (e.g., a number of player). In some embodiments, a target that is initially identified may be continuously followed in the output video frame.

Figure 5:
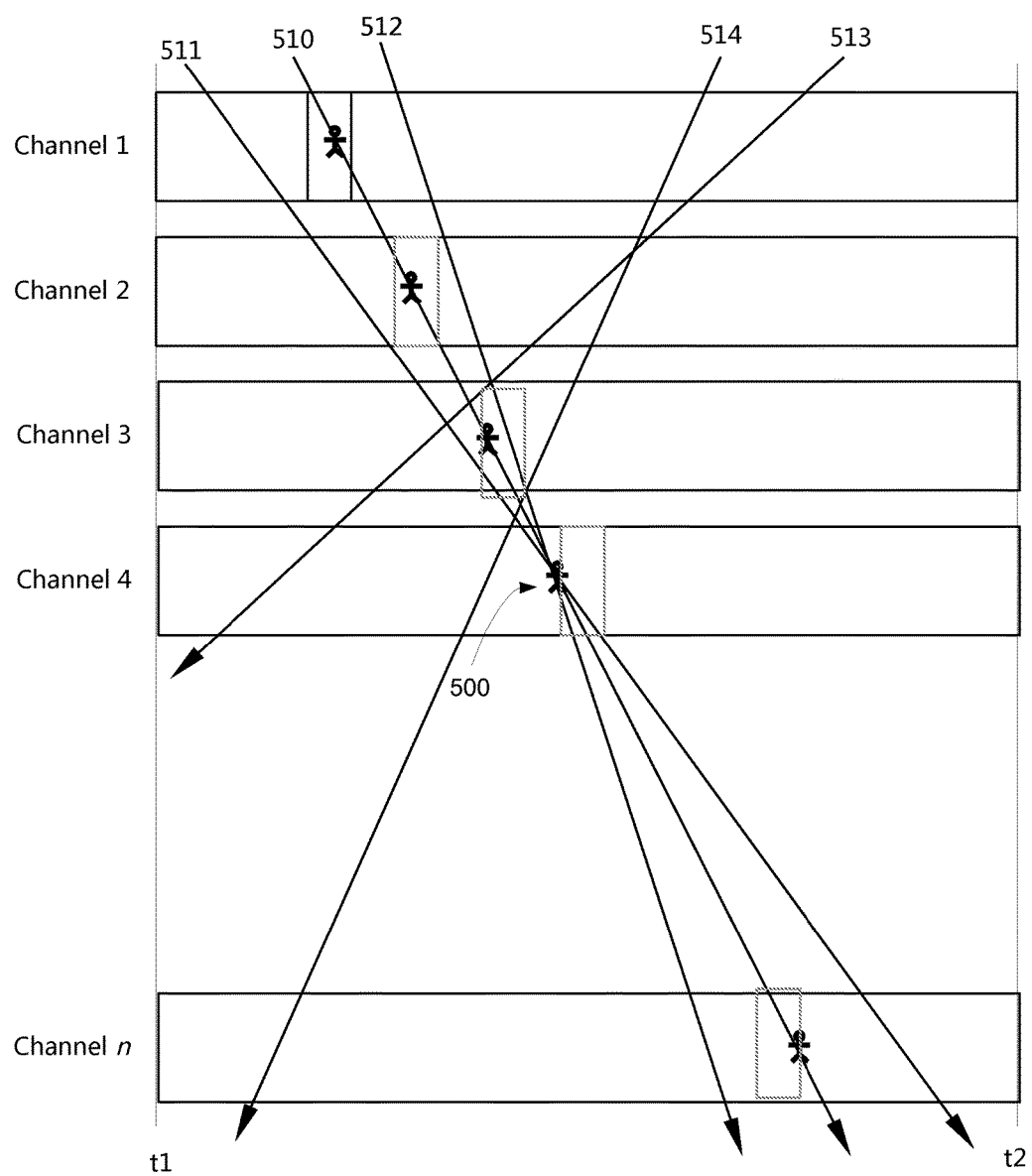
FIG. 5 shows an exemplary process for generating an output video stream with a varying speed and angle, according to one embodiment.

FIG. 5 shows an exemplary process for generating an output video stream with a varying speed and angle, according to one embodiment. Using the multiple cameras installed in a track, the present camera system can cover the entire track from the beginning of a game to the end of the game without missing a moment or event that occurs during the game. The output video stream of a virtual flying camera is generated based on control inputs from a user including, but not limited to, a video angle and speed.

Video frames 500 includes n video channels received from n cameras. Each video channel has video frames 1-*m*, and each of the video frames was taken from at a time between t1 to t2. A target 500 moves within the video frames from the n video channels as indicated by an arrow 510. A first output video stream is generated by following the target 500 as explained with reference to FIGS. 3 and 4. Since the output video stream is reconstructed by the input video stream by merging and switching video frames from the n video channels without adjusting the time scale of the input video stream, the speed of the virtually flying camera is the same as the speed of the moving target 500.

According to one embodiment, the speed of the virtually flying camera can be changed by shifting the video frames at a speed different from the speed of the target 500. The arrow 511 indicates the video frames that are used to generate a faster flying camera that sweeps the track faster than the speed of the target 500. Such a video output stream may include a panning or a sweeping shot of a target to show the dynamics of the target covering from the rear view to the front view within the output video stream. This may provide a dramatized view of the target that is more visually appealing.

According to one embodiment, the speed of the virtually flying camera is deliberately slowed down to show a video from a leading player to following players. The arrow 512 indicates the video frames that are used to generate a slowly flying camera that that sweeps the track slower than the speed of the target 500. Similarly, the arrows 513 and 514 indicate the video frames that are used to generate a flying camera that may fly in a reverse direction at different speeds.

The present camera system includes cameras that are installed along a track. In this case, the output video stream may have only two camera angles, forward or backward. According to one embodiment, the cameras may be installed in a three-dimensional fashion such that an output video stream from a virtually flying camera that flies in a three-dimensional (3D) space can be generated. In this case, a diverse camera angle may be achieved. Due to the simplicity of players' action that may occur during a game play, a two-dimensional (2D) camera system as shown in FIG. 1 may be sufficient to cover a track sports such as an ice speed skating, a short track speed skating, etc.

A virtual flying camera system has been disclosed. Although various embodiments have been described with respect to specific examples and subsystems, it will be apparent to those of ordinary skill in the art that the concepts disclosed herein are not limited to these specific examples or subsystems but extends to other embodiments as well. Included within the scope of these concepts are all of these other embodiments as specified in the claims that follow.

I claim:

1. A camera system comprising:
 a plurality of cameras disposed along a track and spaced apart from each other;
 a recording system configured to receive input video streams from the plurality of cameras; and
 a video stream processor configured to generate an output video stream from the input video streams,
 wherein the input video streams comprise a plurality of input video frames, each of the plurality of input video frames includes at least a partial image of a moving target,
 wherein the output video stream comprises a plurality of output video frames, each of the plurality of output video frames is generated by shifting a corresponding input video stream to position the moving target at a desired location within the output video frame, and
 wherein the output video stream is playable at a user-adjustable speed showing a view of a virtually flying camera that follows the moving target at the desired location within each of the plurality of output video frames.

2. The camera system of claim 1 further comprising a plurality of camera modules, wherein a group of the plurality of cameras are mounted to each of the plurality of camera modules.

3. The camera system of claim 1, wherein the plurality of cameras are positioned at a predetermined interval.

4. The camera system of claim 3, wherein the video stream processor determines a speed of the target based on time stamps of the input video stream and the predetermined interval between the plurality of cameras.

5. The camera system of claim 1, wherein the recording system includes a data interface configured to receive the input video streams from the plurality of cameras via a cable and a storage configured to record the input video streams.

6. The camera system of claim 5, wherein the input video streams are recorded in the storage as compressed.

7. The camera system of claim 1, wherein the shifted input video stream is stitched with a portion of an input video frame received from a next camera or a pre-recorded background video stream.

8. The camera system of claim 1, wherein each video frame of the output video stream includes a first portion that shifted from at least one of the input video streams and a second portion that is obtained from a background image.

9. The camera system of claim 8, wherein the background image is obtained before the input video streams are received.

10. The camera system of claim 1, wherein the video stream processor determines a subset of the plurality of cameras and a sequence of the input video streams of the subset of the plurality of cameras to generate the output video stream.

11. A method comprising:
providing a plurality of cameras along a track and spaced apart from each other;
receiving input video streams from the plurality of cameras, wherein the input video streams comprise a plurality of input video frames, each of the plurality of input video frames includes at least a partial image of a moving target;
generating an output video stream including a plurality of output video frames from the input video streams, wherein each of the plurality of output video frames is generated by shifting a corresponding input video stream to position the moving target at a desired location within the output video frame,
wherein the output video stream is playable at a user-adjustable speed showing a view of a virtually flying camera that follows the moving target at the desired location within each of the plurality of output video frames.

12. The method of claim 11, wherein a group of the plurality of cameras are mounted to a camera module, and the camera system includes a plurality of camera modules.

13. The method of claim 11, wherein the plurality of cameras are positioned at a predetermined interval.

14. The method of claim 13 further comprising determining a speed of the target based on time stamps of the input video stream and the predetermined interval between the plurality of cameras.

15. The method of claim 11, wherein the recording system includes a data interface configured to receive the input video streams from the plurality of cameras via a cable and a storage configured to record the input video streams.

16. The method of claim 15, further comprising recording the input video streams in the storage as compressed.

17. The method of claim 11, further comprising stitching the shifted input video stream with a portion of an input video frame received from a next camera or a pre-recorded background video stream.

18. The method of claim 11, wherein each video frame of the output video stream includes a first portion that shifted from at least one of the input video streams and a second portion that is obtained from a background image.

19. The method of claim 18, wherein the background image is obtained before the input video streams are received.

20. The method of claim 11, further comprising determining a subset of the plurality of cameras and a sequence of the input video streams of the subset of the plurality of cameras to generate the output video stream.

* * * * *